Figure 1:
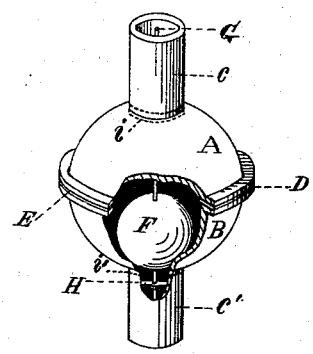

R. L. WALKER.
Stench-Trap.

No. 160,800.
Patented March 16, 1875.

UNITED STATES PATENT OFFICE.

ROBERT L. WALKER, OF BOSTON, MASSACHUSETTS.

IMPROVEMENT IN STENCH-TRAPS.

Specification forming part of Letters Patent No. 160,800, dated March 16, 1875; application filed February 10, 1875.

*To all whom it may concern:*

Be it known that I, ROBERT L. WALKER, of Boston, in the county of Suffolk, State of Massachusetts, have invented a certain new and useful Improvement in Stench-Traps, of which the following is a description sufficiently full, clear, and exact to enable any person skilled in the art or science to which my invention appertains to make and use the same, reference being had to the accompanying drawing, forming a part of this specification, in which—

Figure 1 is a sectional isometrical view.

My invention relates more especially to that class of stench-traps which are employed in sinks, water-closets, &c.; and consists in a novel construction and operation of the parts, as hereinafter more fully set forth and claimed, by which a simpler, cheaper, and more effective device of this character is produced than is now in ordinary use.

It is well known that many of the traps employed in plumbing for this purpose frequently become clogged or filled up, and imperfectly prevent the return or escape of foul gases or nauseating vapors, the flow of liquids through the trap being indirect, and no means being provided for the entire closing of the main branch or soil pipe when not in use.

My invention is designed to obviate these difficulties and objections, and to that end I provide the soil-pipe or branch, as the case may be, with the enlarged globular section represented at A B in the drawing. This section or hollow globe is composed of two semispherical disks, connected together by the annular flanges D E, the disk A being also connected to the pipe C by the joint $i$, and the disk B to the pipe C' by the joint $i'$. Within the pipe C' there is a fixed cross-bar, H, a similar bar being disposed in the pipe C. These bars are provided with holes forming ways, in which the guide-rod G works, and on this rod, within the disks A B, there is fixed the hollow globe F, composed of thin sheet metal, to render it as light as possible and still maintain the requisite strength.

From the foregoing the nature and operation of my invention will be readily obvious to all conversant with such matters, and it will be seen that when the parts are in the position shown, if water or other liquid is admitted through the induction-pipe C into the enlarged section formed by the disks A B, the small globe F will be caused to float, the rod G sliding in the bar H, and thus permitting the fluid to pass off through the eduction-pipe C', after which the globe will fall by gravitation, completely closing the mouth to the pipe C, and effectually preventing the return escape of air or offensive gases.

It will also be obvious that my improvement is valuable in many situations for preventing the return flow of water in sewers and drain-pipes, the globe F in such cases floating as the water comes in through the pipe C' and closing the pipe C.

Having thus described my invention, what I claim is—

The stench-trap described, the same consisting of the disks A B, globe F, rod G, and bars H, constructed and arranged to operate in combination with the pipes C C', substantially as and for the purpose specified.

ROBERT L. WALKER.

Witnesses:
C. A. SHAW,
H. E. METCALF.